(12) United States Patent
Spaleny

(10) Patent No.: US 11,143,219 B2
(45) Date of Patent: Oct. 12, 2021

(54) MOLDED ARTICLE WITH LOCATOR PIN HAVING LEDGE

(71) Applicant: NYX, Inc., Livonia, MI (US)

(72) Inventor: Steven F. Spaleny, Flushing, MI (US)

(73) Assignee: NYX, INC., Livonia, MI (US)

(*) Notice: Subject to any disclaimer, the term of this patent is extended or adjusted under 35 U.S.C. 154(b) by 331 days.

(21) Appl. No.: 15/958,006

(22) Filed: Apr. 20, 2018

(65) Prior Publication Data

US 2018/0306217 A1 Oct. 25, 2018

Related U.S. Application Data

(60) Provisional application No. 62/487,523, filed on Apr. 20, 2017.

(51) Int. Cl.
| | |
|---|---|
| *F16B 1/00* | (2006.01) |
| *G01B 3/00* | (2006.01) |
| *F16S 1/14* | (2006.01) |
| *F16B 5/06* | (2006.01) |

(52) U.S. Cl.
CPC ............ *F16B 1/00* (2013.01); *F16B 5/065* (2013.01); *F16S 1/14* (2013.01); *G01B 3/002* (2013.01); *F16B 2001/0092* (2013.01)

(58) Field of Classification Search
CPC .... F16B 1/00; F16B 5/065; F16B 2001/0092; F16S 1/14; G01B 3/002
See application file for complete search history.

(56) References Cited

U.S. PATENT DOCUMENTS

| | | | | |
|---|---|---|---|---|
| 5,799,378 A | * | 9/1998 | Gershenson | ....... A44B 18/0053 24/452 |
| 2013/0287518 A1 | * | 10/2013 | Scroggie | ................. F16B 5/065 411/78 |
| 2014/0001321 A1 | * | 1/2014 | Huelke | ............... B60R 13/0206 248/206.5 |
| 2016/0214547 A1 | * | 7/2016 | Iriarte Jimenez | ... B60R 13/0206 |

* cited by examiner

*Primary Examiner* — Brian Handville
(74) *Attorney, Agent, or Firm* — Carlson, Gaskey & Olds, P.C.

(57) ABSTRACT

An article includes a molded plastic body that is comprised of a main body portion and a locator pin that projects from the main body portion. The locator pin includes a base at the main body and a pin that extends from the base and has a tip end. The base and the pin are of different sizes so as to form a ledge that faces away from the main body portion. The pin includes a parallel-sided portion that is located within a zone that starts at the base and terminates short of the tip end.

20 Claims, 1 Drawing Sheet

MOLDED ARTICLE WITH LOCATOR PIN HAVING LEDGE

BACKGROUND

Assemblies are often built from multiple different components. Some of the components may be plastic and other of the components may be metal. It is not uncommon for plastic and metal components to be secured together. A challenge, however, with plastic components is meeting dimensional tolerances to ensure proper fit with the metal components. For quality assurance, critical locations on the plastic components may be measured to verify dimensions are within a specified tolerance range. If the plastic component fails to meet the specified tolerance, it may be scraped, resulting in higher manufacturing cost.

This issue can be further compounded by the measurement technique of the plastic component. If, for instance, a caliper is used to measure a dimension, care must be taken to place the caliper at precisely the critical location. Deviation from the critical location may result in error in the measurement, which of course could lead to measurements that indicate that a component meets the specified tolerance when it really does not, or vice versa. Often, this type of error is minimized by using a controlled measuring procedure, but even then error may not be eliminated. As will be described herein below, this disclosure addresses this type of problem by building-in a geometry in the component which aids measurement so that measuring error can be reduced.

SUMMARY

An article according to an example of the present disclosure includes a molded plastic body comprised of a main body portion and a locator pin projecting from the main body portion. The locator pin has a base at the main body and a pin extending from the base and having a tip end. The base and the pin are of different sizes so as to form a ledge that faces away from the main body portion. The pin has a parallel-sided portion that is located within a zone starting at the base and terminating short of the tip end.

In a further embodiment of any of the foregoing embodiments, the parallel-sided portion starts at the base.

In a further embodiment of any of the foregoing embodiments, the pin includes a tapered portion starting at an end of the parallel-sided portion.

In a further embodiment of any of the foregoing embodiments, the tapered portion has a taper angle of greater than 0.25°.

In a further embodiment of any of the foregoing embodiments, the tapered portion has a taper angle of 1° to 5°.

In a further embodiment of any of the foregoing embodiments, the pin defines a central axis, the parallel-sided portion has length in a direction parallel to the central axis, the ledge has a ledge dimension in a direction perpendicular to the central axis, and a ratio of the length to the ledge dimension is from 1:1 to 9:1.

In a further embodiment of any of the foregoing embodiments, the ratio is from 2:1 to 4:1.

In a further embodiment of any of the foregoing embodiments, the ledge dimension is from 1 millimeter to 2 millimeters.

In a further embodiment of any of the foregoing embodiments, the ratio is approximately 3:1.

A further embodiment of any of the foregoing embodiment includes a sheet-metal article having an orifice, and pin extends through the orifice.

In a further embodiment of any of the foregoing embodiments, the pin and the base have circular cross-sections, and the difference in size is the diameters of the circular cross-sections.

An article according to an example of the present disclosure includes a molded plastic body comprised of a main body portion and a locator pin projecting from the main body portion. The locator pin has a base at the main body and a pin extending from the base and has a tip end. The base and the pin is of different sizes so as to form a ledge that faces away from the main body portion, and wherein the pin, starting at the base, has a parallel-sided region that terminates short of the tip end.

In a further embodiment of any of the foregoing embodiments, the pin includes a tapered portion starting at an end of the parallel-sided portion.

In a further embodiment of any of the foregoing embodiments, the tapered portion has a taper angle of greater than 0.25°.

In a further embodiment of any of the foregoing embodiments, the tapered portion has a taper angle of 1° to 5°.

In a further embodiment of any of the foregoing embodiments, the pin defines a central axis, the parallel-sided portion has length in a direction parallel to the central axis, the ledge has a ledge dimension in a direction perpendicular to the central axis, and a ratio of the length to the ledge dimension is from 1:1 to 9:1.

In a further embodiment of any of the foregoing embodiments, the ratio is from 2:1 to 4:1.

In a further embodiment of any of the foregoing embodiments, the ledge dimension is from 1 millimeter to 2 millimeters.

In a further embodiment of any of the foregoing embodiments, the pin and the base have circular cross-sections, and the difference in size is the diameters of the circular cross-sections.

A further embodiment of any of the foregoing embodiments includes a sheet-metal article having an orifice, and pin extends through the orifice.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
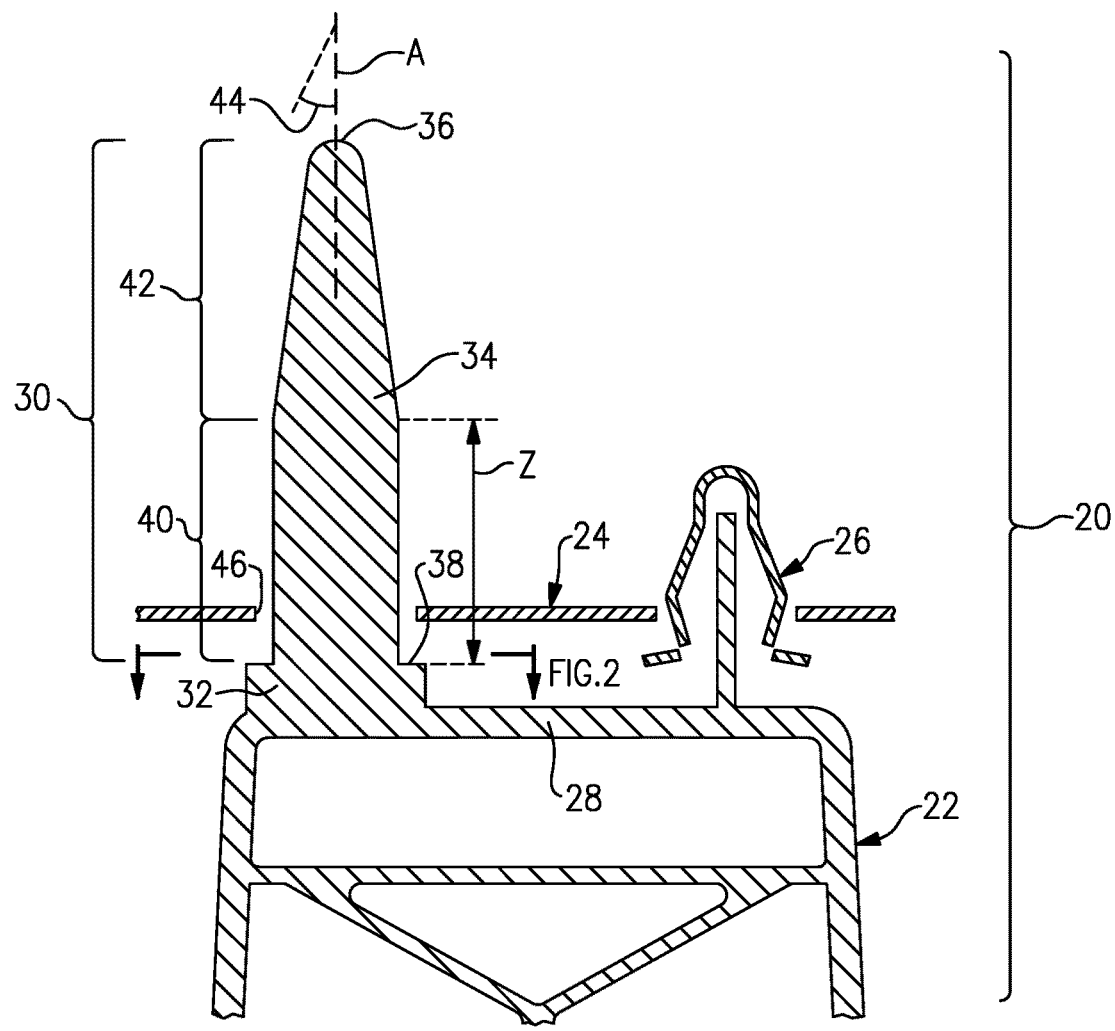
FIG. 1 illustrates an example article.

FIG. 1 illustrates a sectioned view of an example article 20. It is to be appreciated that the article 20 is merely an example and that the features described herein may be applicable to other articles that would benefit. In this case, the article 20 is an automotive interior component. Example interior components may include, but are not limited to, heating, ventilating, and air conditioning modules, storage compartments or consoles, and interior trim.

The article 20 includes a plastic component 22 and a metal component 24, such as a sheet metal component. The components 22/24 may be provided separately and then assembled together. In that regard, the article 20 may alternatively refer to only the plastic component 22, prior to assembly. Although not limited, in this example, the plastic component 22 is secured to the metal component 24, at least in part, by a clip 26. A "plastic" generally refers to an organic polymer of high molecular weight. Example plastics may include, but are not limited to, polypropylene, polyethylene, polycarbonate, acrylonitrile butadiene styrene, and combinations thereof.

The plastic component 22 is a molded plastic body that is comprised of a main body portion 28 and a locator pin 30 projecting from the main body portion 28 along a central pin axis A. The locator pin 30 includes a base 32 at the main body portion 28 and a pin 34 that extends from the base 32. The pin 34 extends to a free tip end 36. The molded plastic body will most typically be formed by injection molding, but is not limited to that particular technique. As such, it is to be understood that the plastic component is a single integrated part, in which the main body portion 28 and locator pin 30 (including the base 32 and pin 34) are one monolithic piece rather than several pieces that are mechanically joined or physically bonded together. Indeed, it is the nature of plastic components and, in particular, molded components from which the benefits herein arise.

Figures 2, 3:
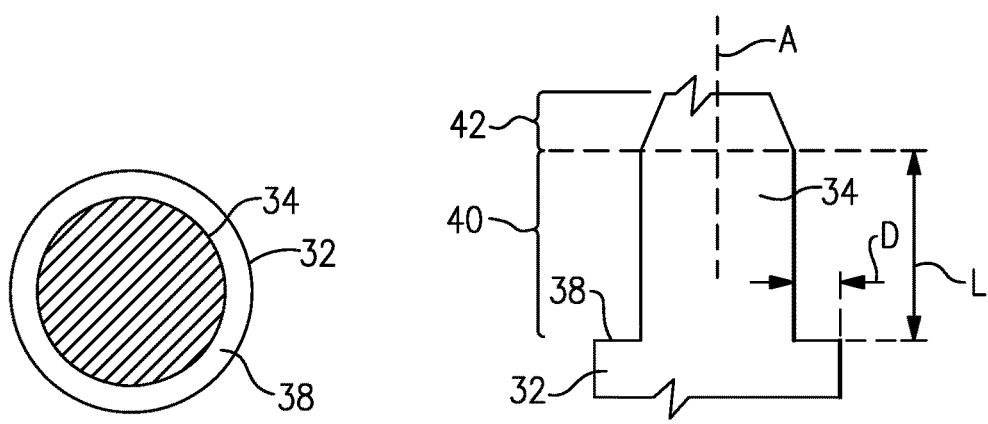
FIG. 2 illustrates a section view of a portion of the article of FIG. 1.
FIG. 3 illustrates a portion of the article of FIG. 1.

Referring also to FIG. 2, which shows a sectioned view through the pin 34, the base 32 and the pin 34 are of different sizes so as to form a ledge 38 that faces away from the main body portion 28. In the illustrated example, both the base 32 and the pin 34 have circular cross-sections. The base 32 has a larger diameter than the pin 34, and it is this difference that forms the ledge 38. In this case, the ledge 38 is uniform and continuous, and extends completely around the pin 34. For instance, the base 32 and the pin 34 are concentric.

The pin 34 includes a parallel-sided portion 40 that is located within in a zone, generally represented at Z, that spans from the base 32 and terminates short of the tip end 36. In this example, the parallel-sided portion 40 begins at the base 32, but it is to be understood that the parallel-sided portion 40 may alternatively begin at a point that is above the base 32 within the zone Z. Most typically though, the parallel-sided portion 40 will begin at the base 32. The functionality of the parallel-sided portion 40 will be discussed in further detail below.

The pin 34 in this example further includes a tapered portion 42. The tapered portion 42 starts starting at an end of the parallel-sided portion 40. In this example, the tapered portion 42 extends all the way to the tip end 36. The tapered portion 42 has a taper angle, shown at 44. The taper angle 44 is the angle that the sides of the tapered portion 42 form with the central axis X (or a line parallel with the central axis A). As an example, the taper angle is greater than 0.25°. It should also be noted that all sides of the tapered portion 42 taper, i.e., there are no overhangs, as that would likely preclude moldability. In a further example, the taper angle 44 is greater than 0.5°, greater than 1°, or from 1° to 5°. The taper angle will be discussed in further detail below.

The locator pin 30 is used to properly position the plastic component 22 relative to the metal component 24. For instance, the metal component 24 includes an orifice 46 and the locator pin 30 extends through the orifice 46. The size of the pin 34 is critical to a proper fit between the locator pin 30 and the orifice 46. Further, alignment of other features between the plastic component 22 and metal component 24 or other ancillary components may depend on this proper fit. In this regard, the ledge 38 and parallel-sided portion 40 serve to facilitate accurate measurement on the locator pin 30, and specifically of the pin 34, to ensure it is properly dimensioned.

As an example, a caliper, micrometer, or other mechanical measuring device may be placed around the pin 34 such that the side of the device sits on the ledge 38. The ledge 38 may support the device while a measurement is being taken. The ledge 38 thus functions as a reference surface for taking the measurement. Moreover, when quantities of the plastic component 22 are produced, the ledge 38 in the design ensures that the measurement on each one of the plastic components 22 is always taken at the same relative location.

The parallel-side portion 40 also facilitates taking accurate measurements. A projection on a plastic component typically includes a draft (i.e., a sloping of the sides of the projection from vertical—a draft angle) to aid in removal of the component from the mold during fabrication. Although the sloping is minute, it can affect mechanical measurements by upwards of 15%. For instance, if the location of measurement varies from a desired location on the projection draft to a slightly narrower portion or slightly thicker portion, the measurement will be inaccurate.

The parallel-sided portion 40 adjacent the base 32 eliminates such a concern. While the ledge 38 helps position the measuring device in the same relative location every time, the parallel-sided portion 40 ensures that the measuring device will be measuring at flush surfaces every time. Thus, the ledge 38 and the parallel-sided portion 40 provide a dual approach for enhancing measurement accuracy, which is also built-in to the design of the plastic component 22.

This further enables the possibility of using large taper angles 44, as in the examples above. For instance, in a projection that has a draft, the draft angle is kept small to minimize the risk of measurement variations. With the ledge 38 and parallel-sided portion 40, which remove such variation, the taper angle 44 of the tapered portion 42, which does not participate in the measurement, can be made larger without concern that it might affect measurements.

In further examples, there are several inter-related features of the locator pin 30 that can further enhance performance. For instance, the relative sizes of the parallel-sided portion 40 and the ledge 38 may be used to define a suitably sized region for both supporting a measurement device and providing adequate area for measurement. In one example shown in FIG. 3, the parallel-sided portion 40 has a length L in a direction that is parallel to the central axis A and the ledge 38 has a ledge dimension D in a direction perpendicular to the central axis A. The length L is the axial span between terminating ends of the parallel-sided portion 40. In an example where the parallel-sided portion 40 begins at the base 32 and terminates at the tapered portion 42, the length L would be the axial length between the base 32 and the starting edge of the tapered portion 42. The ledge dimension D is the horizontal length between the corner of the base 32 and the side of the parallel-sided portion 40. In one example inter-related feature, a ratio of the length L to the ledge dimension D is from 1:1 to 9:1. In further examples, the ratio is from 2:1 to 4:1, or more preferably about 3:1. The ratios are unitless, but may be determined based on measurement in appropriate units, such as millimeters or inches. Although not necessarily tied to any specific dimensions, in one example the ledge dimension D is from about 1 millimeter to about 3 millimeters or 2 millimeters. Below this size, a ledge may be unable to effectively support a measuring device or, at the least, there may be greater risk of the device slipping and thus altering the measurement. Above this size, a ledge provides little or no additional support benefit, and may be considered to be a waste of material or a hindrance to neighboring structures.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
a molded plastic body comprised of a main body portion and a locator pin projecting from the main body portion, the locator pin including a base protruding from the main body and a pin extending from the base and having a tip end, the base and the pin being of different sizes so as to form a ledge spaced-apart from the main body portion along a length of the locator pin and that faces away from the main body portion, and the pin including a parallel-sided portion that is located within a zone starting at the base and terminating short of the tip end.

2. The article as recited in claim 1, wherein the parallel-sided portion starts at the base.

3. The article as recited in claim 1, wherein the pin includes a tapered portion starting at an end of the parallel-sided portion.

4. The article as recited in claim 3, wherein the tapered portion has a taper angle of 0.25° to 5°.

5. The article as recited in claim 1, wherein the pin defines a central axis, the parallel-sided portion has length in a direction parallel to the central axis, the ledge has a ledge dimension in a direction perpendicular to the central axis, and a ratio of the length to the ledge dimension is from 1:1 to 9:1.

6. The article as recited in claim 5, wherein the ratio is from 2:1 to 4:1.

7. The article as recited in claim 6, wherein the ledge dimension is from 1 millimeter to 2 millimeters.

8. The article as recited in claim 5, wherein the ratio is approximately 3:1.

9. The article as recited in claim 1, further comprising a sheet-metal article having an orifice, and pin extends through the orifice.

10. The article as recited in claim 1, wherein the pin and the base have circular cross-sections, and the difference in size is the diameters of the circular cross-sections.

11. An article comprising:
a molded plastic body comprised of a main body portion and a locator pin projecting from the main body portion, the locator pin including a base protruding from the main body and a pin extending from the base and having a tip end, the base and the pin being of different sizes so as to form a ledge spaced-apart from the main body portion along a length of the locator pin and that faces away from the main body portion, and wherein the pin, starting at the base, has a parallel-sided region that terminates short of the tip end.

12. The article as recited in claim 11, wherein the pin includes a tapered portion starting at an end of the parallel-sided portion.

13. The article as recited in claim 12, wherein the tapered portion has a taper angle of greater than 0.25°.

14. The article as recited in claim 13, wherein the tapered portion has a taper angle of 1° to 5°.

15. The article as recited in claim 14, wherein the pin defines a central axis, the parallel-sided portion has length in a direction parallel to the central axis, the ledge has a ledge dimension in a direction perpendicular to the central axis, and a ratio of the length to the ledge dimension is from 1:1 to 9:1.

16. The article as recited in claim 1, wherein the ledge terminates at a corner on the base, and the base is of a uniform circular cross-section that starts at the corner and extends to the main body portion.

17. The article as recited in claim 16, wherein the locator pin is solid in cross-section through the pin and the base.

18. The article as recited in claim 17, wherein the parallel-sided portion starts at the base and extends to a tapered portion, and the tapered portion starts at the parallel-sided portion and terminates at the tip end.

19. The article as recited in claim 1, wherein:
the ledge is uniform and continuous,
the ledge extends completely around the locator pin,
the base and the pin are concentric, and
the base exhibits a substantially constant outer diameter between the main body portion and the ledge.

20. The article as recited in claim 1, wherein the locator pin does not increase in diameter moving along the length of the locator pin in a direction from the base to the tip end.

* * * * *